(12) United States Patent
Nakatani et al.

(10) Patent No.: US 8,238,221 B2
(45) Date of Patent: Aug. 7, 2012

(54) OPTICAL PICKUP DEVICE AND RECORDING/REPRODUCTION DEVICE

(75) Inventors: Morio Nakatani, Ichinomiya (JP); Kenji Nagatomi, Kaizu (JP); Yoshiyuki Matsumura, Anpachi-Gun (JP); Seiichiro Takahashi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 224 days.

(21) Appl. No.: 12/541,685

(22) Filed: Aug. 14, 2009

(65) Prior Publication Data
US 2009/0303849 A1 Dec. 10, 2009

Related U.S. Application Data

(63) Continuation of application No. PCT/JP2008/051795, filed on Feb. 4, 2008.

(30) Foreign Application Priority Data

Feb. 16, 2007 (JP) ................... 2007-036939

(51) Int. Cl.
*G11B 7/00* (2006.01)
(52) U.S. Cl. ............ 369/112.23; 369/44.37; 369/47.53; 369/112.01
(58) Field of Classification Search .......... 369/112, 369/112.23, 112.01, 44.37, 47.53
See application file for complete search history.

(56) References Cited

U.S. PATENT DOCUMENTS

| | | | |
|---|---|---|---|
| 5,118,541 A * | 6/1992 | Yamamoto et al. | 428/64.8 |
| 6,625,009 B2 * | 9/2003 | Maeda | 361/528 |
| 7,969,853 B2 * | 6/2011 | Nakatani et al. | 369/112.24 |
| 2002/0009037 A1 * | 1/2002 | Tamada | 369/112.17 |
| 2005/0018582 A1 * | 1/2005 | Tanaka et al. | 369/59.25 |
| 2005/0128909 A1 | 6/2005 | Mukaida | |
| 2006/0072438 A1 * | 4/2006 | Nishino et al. | 369/275.1 |
| 2006/0140070 A1 * | 6/2006 | Shiono et al. | 369/44.23 |
| 2007/0146836 A1 * | 6/2007 | Fukushima et al. | 359/3 |

FOREIGN PATENT DOCUMENTS

| | | | |
|---|---|---|---|
| JP | 61-248232 A | 11/1986 | |
| JP | 2001-325745 A | 11/2001 | |
| JP | 2004-36569 A | 2/2004 | |
| JP | 2004-335060 A | 11/2004 | |
| JP | 3778092 B2 | 5/2006 | |
| JP | 2006-196125 A | 7/2006 | |
| JP | 2006-244551 A | 9/2006 | |
| WO | 2004036569 A1 | 4/2004 | |

OTHER PUBLICATIONS

Machine translation of JP 2004-335060 by Sako Kageyasu on May 12, 2003.* International Search report dated Mar. 4, 2008 for corresponding application No. PCT/JP2008/051795.
International Preliminary Report on Patentability dated Jan. 19, 2009, for corresponding application No. PCT/JP2008/051795.
International Preliminary Report on Patentability for PCT/JP2008/051795, dated Oct. 15, 2009, pp. 1-13.

* cited by examiner

*Primary Examiner* — Wayne Young
*Assistant Examiner* — Linh Nguyen
(74) *Attorney, Agent, or Firm* — Ditthavong Mori & Steiner, P.C.

(57) ABSTRACT

An optical pickup device includes: a first light source for emitting recording laser light; a second light source for emitting reproducing laser light having a wavelength different from a wavelength of the recording laser light; an objective lens for converging the recording laser light and the reproducing laser light. A quarter wavelength plate is disposed between the first light source and the second light source, and the objective lens. A wavelength-selective polarized beam splitter is disposed between the quarter wavelength plate, and the first light source and the second light source. The reproducing laser light alone out of the recording laser light and the reproducing laser light reflected on recording medium is guided to a photodetector.

6 Claims, 10 Drawing Sheets

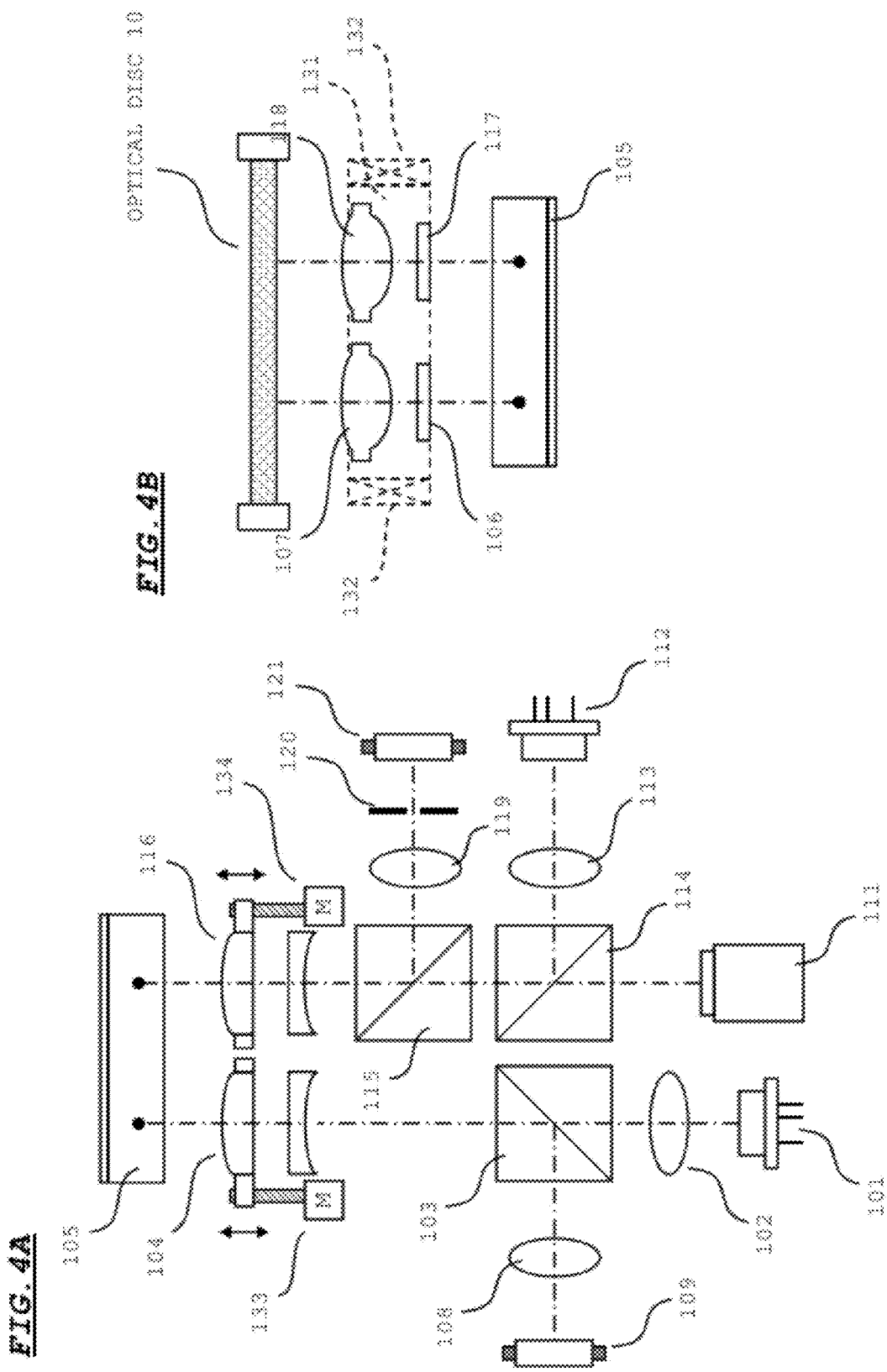

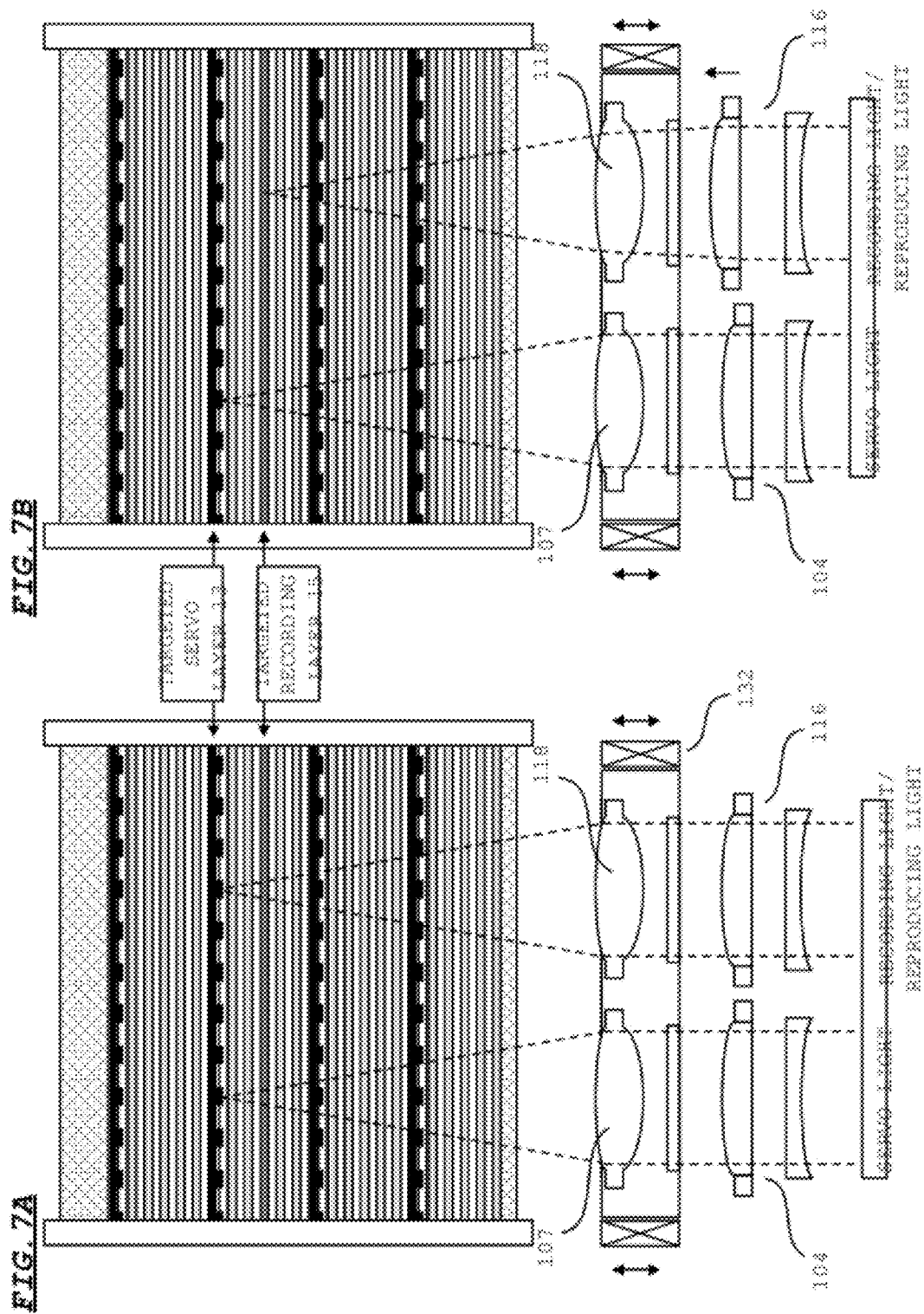

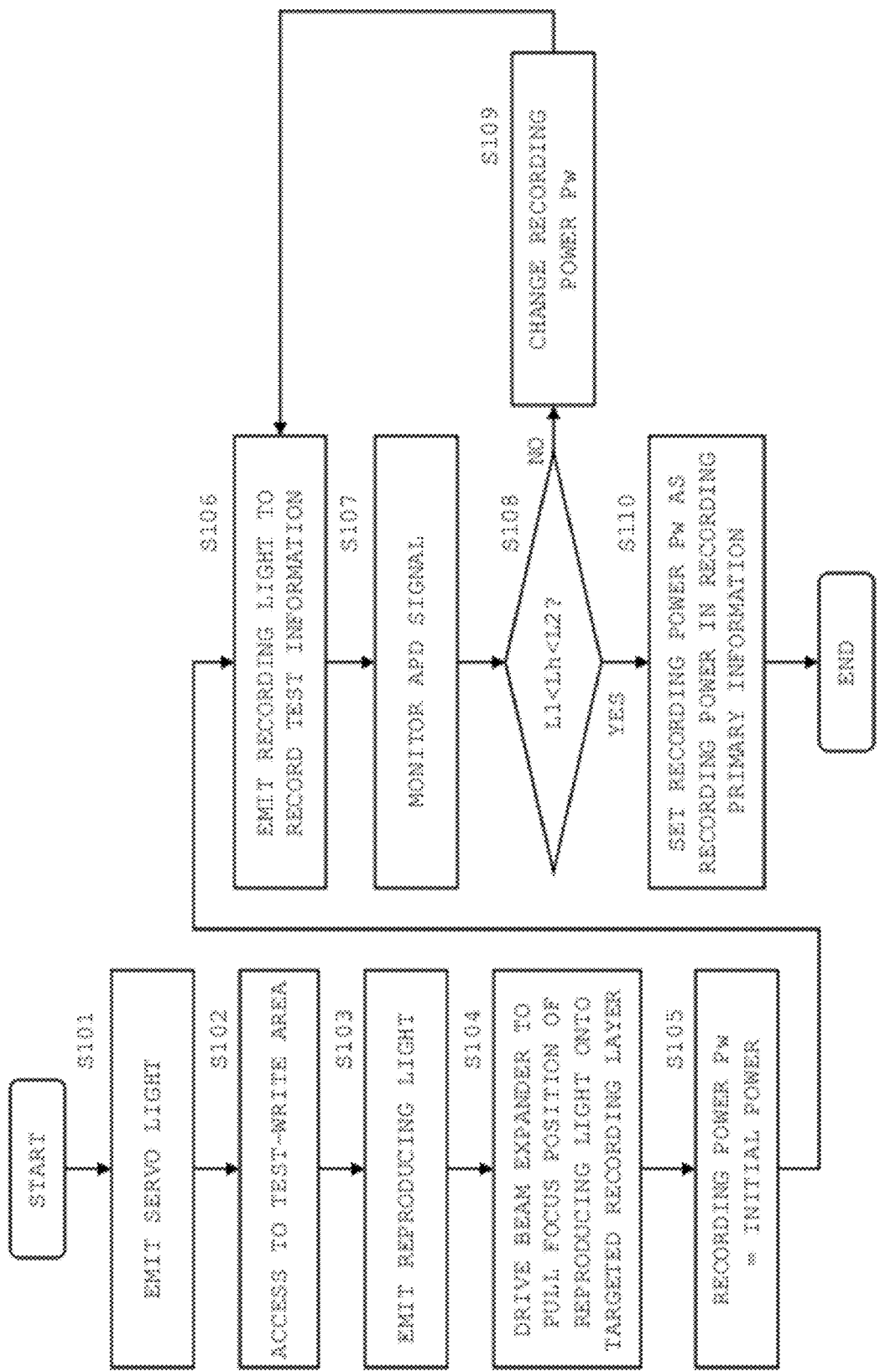

OPTICAL PICKUP DEVICE AND RECORDING/REPRODUCTION DEVICE

This application is a continuation of PCT/JP2008/051795, filed on Feb. 4, 2008, which was published under PCT Article 21(2).

This application claims priority under 35 U.S.C. Section 119 of Japanese Patent Application No. 2007-036939 filed Feb. 16, 2007, entitled "OPTICAL PICKUP DEVICE, AND RECORDING AND REPRODUCING APPARATUS". The disclosers of the above applications are incorporated herein by reference.

BACKGROUND OF THE INVENTION

1. Field of the Invention

The present invention relates to an optical pickup device and a recording and reproducing apparatus, and more particularly to an optical pickup device, and a recording and reproducing apparatus compatible with a recording medium for recording information by multi-photon absorption.

2. Description of the Related Art

Conventionally, there has been used a material (a phase change material, a pigment material, and the like) having a property that the refractive index of a recording layer is changed by absorbing one photon, as a recording layer material. In recent years, there has been proposed a recording medium using a so-called two-photon absorbing material having a property that the refractive index of a recording layer is changed by absorbing two photons, as a recording layer material. In addition to the above, there is an idea of using a multi-photon absorbing material having a property that the refractive index of a recording layer is changed by absorbing three or more photons, as a recording layer material.

In the case where a two-photon absorbing material is used as a recording layer material, information is recorded by two-photon absorption. The two-photon absorption is a phenomenon that a material is excited by absorbing two photons. The probability of occurrence of two-photon absorption is proportional to the square of an incident light intensity (non-linear optical effect). In other words, two-photon absorption is induced solely in an area where the energy of incident light is concentrated. Condensing incident light through a lens enables to generate a condition that two-photon absorption occurs solely on a focal point including its vicinity, whereas two-photon absorption does not occur in the other space where light is not focused. Specifically, two-photon absorption can be induced in the two-photon absorbing material by condensing and irradiating laser light having an absorption wavelength bandwidth of the two-photon absorbing material with an ultra-short pulse and a high intensity. There is also proposed a method for inducing two-photon absorption in a two-photon absorbing material by condensing and irradiating laser light having an absorption wavelength bandwidth of the two-photon absorbing material, while irradiating light of a wavelength other than the absorption wavelength bandwidth. In the latter method, the energy level of the two-photon absorbing material is raised by the light of the wavelength other than the absorption wavelength bandwidth. Accordingly, two-photon absorption is induced even if the intensity level of laser light having the absorption wavelength bandwidth is suppressed to some extent.

An optical recording medium of the above kind may have, for example, an arrangement that a plurality of recording layers and one servo layer are laminated. In the recording medium, a plurality of flat recording layers without guide tracks are formed, and a servo layer having a guide track is formed on these recording layers.

In this arrangement, in performing a recording operation, a focusing servo signal and a tracking servo signal are generated based on the guide track formed in the servo layer, and recording laser light and reproducing laser light are positioned on a recording layer based on the servo signals. Accordingly, the recording laser light and the reproducing laser light scan the recording layer to follow an intended scanning trajectory, whereby information is recorded/reproduced with respect to the recording layer.

In the case where a recording operation is performed with respect to an optical recording medium using a multi-photon absorbing material, similarly to an existing optical disc, it is necessary to adjust the power of recording laser light to a proper level. If the power of recording laser light is unduly small, information cannot be smoothly recorded. If, on the other hand, the power of recording laser light is unduly large, problems such as erroneous recording in an adjacent track, or cross-erasing may occur.

In an existing optical disc apparatus, a test-recording operation is performed with respect to a test-write area with a different power, and an optimal recording power with respect to an optical disc to be recorded is set, based on a data error ratio or the like to be obtained in reproducing from the test-write area. In this arrangement, however, since two steps i.e. a test-writing step and a reproducing step are necessary, there is a problem that a certain time is required for setting a recording power.

SUMMARY OF THE INVENTION

In view of the above, an object of the present invention is to provide an optical pickup device, and a recording and reproducing apparatus capable of speedily and smoothly setting a power of recording laser light with respect to a recording medium using a multi-photon absorbing material. Another object of the present invention is to provide an optical pickup device, and a recording and reproducing apparatus capable of smoothly adjusting a power of recording laser light in recording primary information.

A first aspect of the present invention is directed to an optical pickup device. The optical pickup device according to the first aspect includes: a first light source for emitting recording laser light; a second light source for emitting reproducing laser light having a wavelength different from a wavelength of the recording laser light; an objective lens for converging the recording laser light and the reproducing laser light; a quarter wavelength plate disposed between the first light source and the second light source, and the objective lens; a photodetector for receiving the reproducing laser light reflected on a recording medium; and a wavelength-selective polarized beam splitter, disposed between the quarter wavelength plate, and the first light source and the second light source, for guiding the reproducing laser light alone out of the recording laser light and the reproducing laser light reflected on the recording medium to the photodetector.

A second aspect of the present invention is directed to a recording and reproducing apparatus. The recording and reproducing apparatus according to the second aspect includes: the optical pickup device according to the first aspect; a recording circuit for performing a recording operation with respect to the recording medium, while simultaneously driving the first light source and the second light source; and a power control circuit for monitoring a signal to be outputted from the photodetector in performing the recording operation to control a power of the recording laser light based on the signal.

BRIEF DESCRIPTION OF THE DRAWINGS

Above and other objects, and novel features of the present invention will become more apparent upon reading the following detailed description of the embodiment along with the accompanying drawings.

FIGS. 4A and 4B are diagrams showing an arrangement (optical system) of an optical pickup device in accordance with the embodiment of the present invention.

FIGS. 7A and 7B are conceptual diagrams showing recording and reproducing operations in accordance with the embodiment of the present invention.

FIG. 9 is a flowchart showing an operation of setting the power of recording light in accordance with the embodiment of the present invention.

Figure 1:
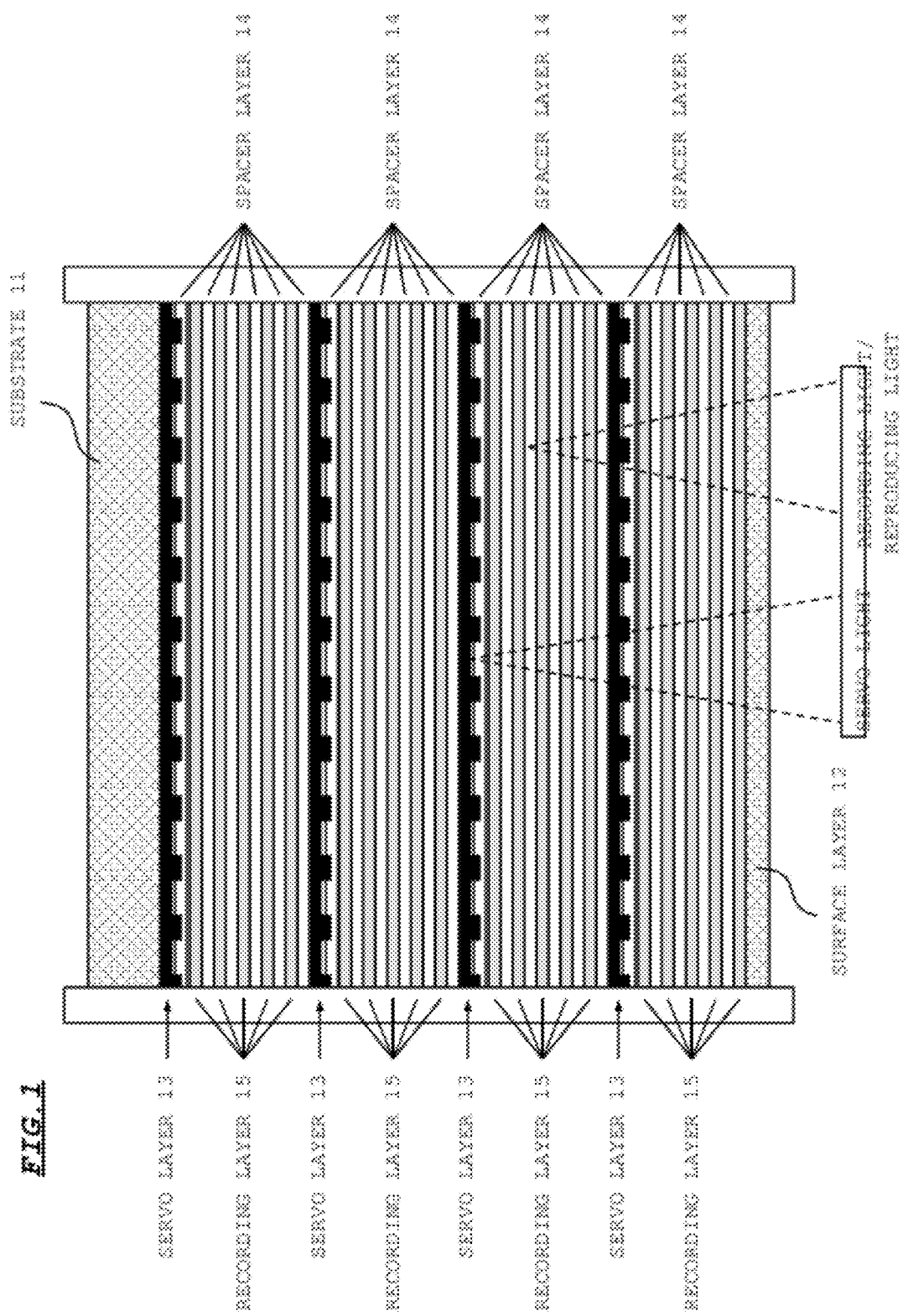
FIG. 1 is a diagram showing a sectional structure of an optical disc in accordance with an embodiment of the present invention.

The drawings are provided mainly for describing the present invention, and do not limit the scope of the present invention.

DESCRIPTION OF THE PREFERRED EMBODIMENTS

In the following, an embodiment of the present invention is described referring to the drawings. This embodiment is an example, wherein the present invention is applied to an optical disc apparatus and an optical pickup device for recording and reproducing information on and from an optical disc having a plurality of sets of layers each constituted of one servo layer and a plurality of two-photon recordable recording layers in a laminated direction. In this embodiment, in performing a recording operation, reproducing laser light is irradiated on a recording layer simultaneously with recording laser light to induce two-photon absorption in the recording layer.

The "power control circuit" in claims 2 through 6 corresponds to a controller 211 in the embodiment. The "recording circuit" in claim 2 and claim 3 corresponds to an encoder 211, a modulating circuit 202, and a laser driving circuit 203 in the embodiment.

The recitation "performing a recording operation with respect to the recording medium by at least the recording laser light, while simultaneously driving the first light source and the second light source" in claim 2 encompasses an arrangement that reproducing laser light is used for a recording operation, including a case that a recording operation by recording laser light is promoted by raising the energy level of a recording layer by reproducing laser light, in addition to a case that reproducing laser light is used solely to monitor a recorded state.

FIG. 1 shows a sectional structure of an optical disc 10 in accordance with the embodiment.

As shown in FIG. 1, the optical disc 10 is constructed in such a manner that four sets of layers are formed between a substrate 11 and a surface layer 12, wherein each set of layers is constituted of a servo layer 13, six spacer layers 14, and five recording layers 15.

The substrate 11 and the surface layer 12 are each made of a light transmissive material such as polycarbonate, polyolefin, or acrylic resin. A biodegradable material, a UV curable resin, an adhesive film, or the like may be used as a material of the substrate 11 and the surface layer 12.

The servo layer 13 is made of a material having a high reflectance with respect to servo laser light (hereinafter, referred to as "servo light"), and low reflectances with respect to recording laser light (hereinafter, referred to as "recording light") and reproducing laser light ("hereinafter, referred to as "reproducing light"). In the embodiment, red laser light of about 635 nm wavelength is used as servo light, infrared laser light of 800 nm wavelength is used as recording light, and blue laser light of about 450 nm wavelength is used as reproducing light. In view of this, for instance, niobium pentoxide is used as a material of the servo layer 13.

Figure 2:
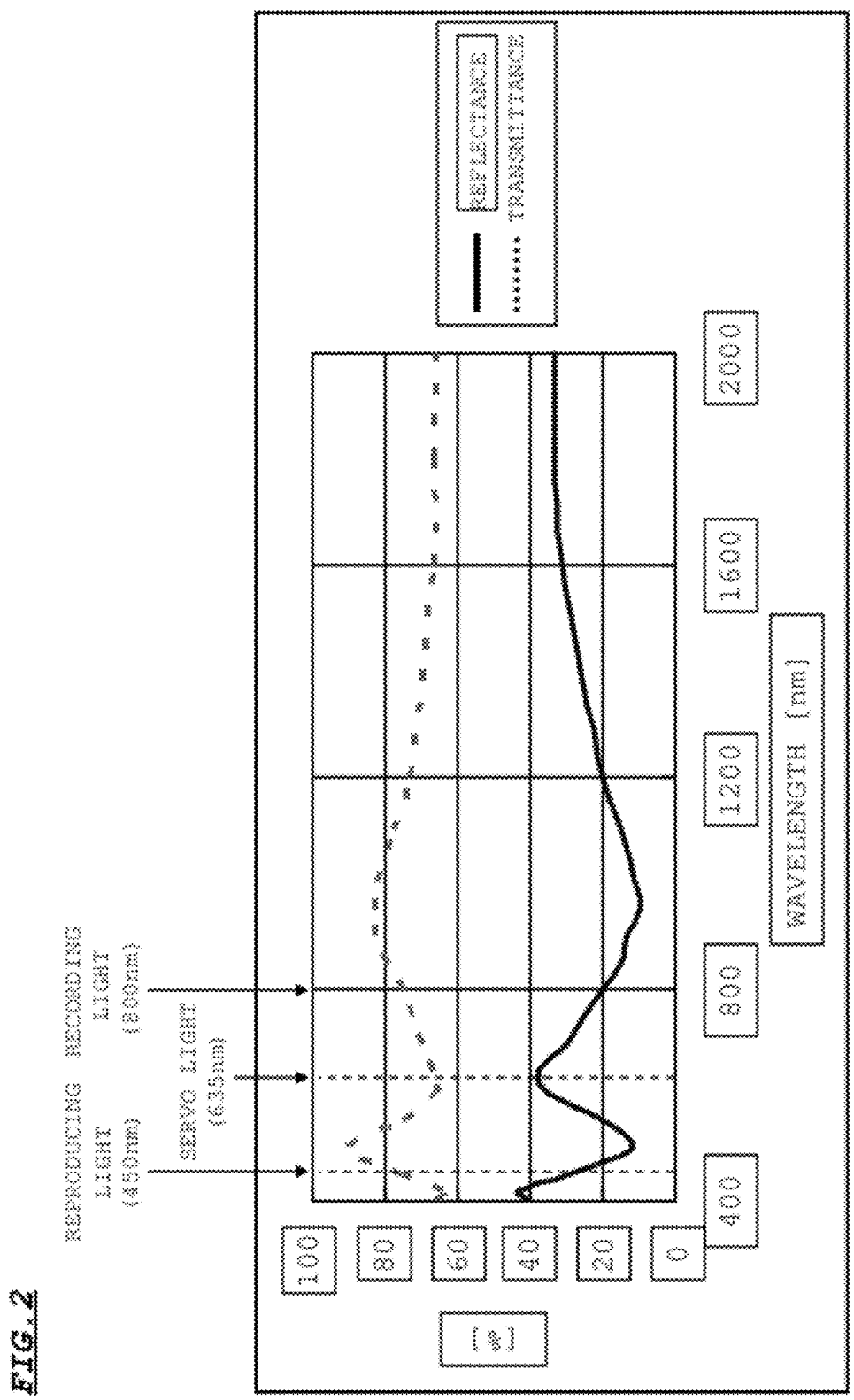
FIG. 2 is a diagram showing an optical characteristic of a servo layer material in accordance with the embodiment of the present invention.

FIG. 2 is a diagram showing an optical characteristic of a film made of niobium pentoxide. As shown in FIG. 2, the film has a high reflectance with respect to light near 635 nm wavelength, and extremely low reflectances with respect to light near 500 nm wavelength and 800 nm wavelength. Accordingly, in the case where the wavelength of servo light is set to 635 nm, and the wavelengths of recording light and reproducing light are respectively set to 450 nm and 800 nm, as described above, the film has a high reflectance with respect to servo light, and low reflectances with respect to recording light and reproducing light.

In this example, niobium pentoxide is used as a material of the servo layer 13. This is because, the wavelengths of servo light, recording light, and reproducing light are respectively set to 635 nm, 800 nm, and 450 nm, as described above. In the case where the wavelengths of servo light, recording light, and reproducing light are set to values other than the above, a material having a high reflectance with respect to servo light, and low reflectances with respect to recording light and reproducing light is selected as a material of the servo layer 13.

Referring back to FIG. 1, the spacer layer 14 is made of a UV curable resin, or a transparent film member coated with an adhesive agent on both surfaces thereof.

The recording layer 15 is made of a material having a property that the refractive index of the recording layer 15 is changed by two-photon absorption. In this embodiment, recording light and reproducing light are simultaneously irradiated on the recording layer 15 in performing a recording operation. Two-photon absorption is induced by irradiating recording light on the recording layer 15, while irradiating reproducing light on the recording layer 15, thereby raising the energy level of the recording layer 15. In view of this, a two-photon absorbing material having the above optical function is used as a material of the recording layer 15.

An exemplified material of the recording layer 15 is a diarylethene derivative or a spiropyran derivative. In this embodiment, since the wavelengths of recording light and reproducing light are respectively set to 800 nm and 450 nm, cis-1,2-dicyano-1,2-bis(2,4,5-trimethyl-3-thienyl) can be used as an exemplified material of the diarylethene derivative, and 1,3,3-trimethylindolino-6-nitrobenzopyrylospiran can be used as an exemplified material of the spiropyran derivative. In the case where wavelengths other than 800 nm and 450 nm are selected as the wavelengths of recording light and reproducing light, the material of the recording layer is changed depending on the selected wavelengths. Other examples of the recording layer 15 are a photopolymer, a photorefractive crystal, a fluorescent pigment, and a fluorescent material containing ZnS or ZnO.

A spiral groove is formed in the servo layer 13, and accordingly a spiral land is formed on an area between the groove areas. The structures of the groove and the land will be described later referring to FIG. 5A. The recording layers 15 are each made of a uniform and flat film having a predetermined thickness. The spacer layers 14 are respectively formed between the servo layer 13 and the recording layer 15, between the surface layer 12 and the recording layer 15, and between the respective two recording layers 15 adjacent to each other in the laminated direction.

Figure 3:
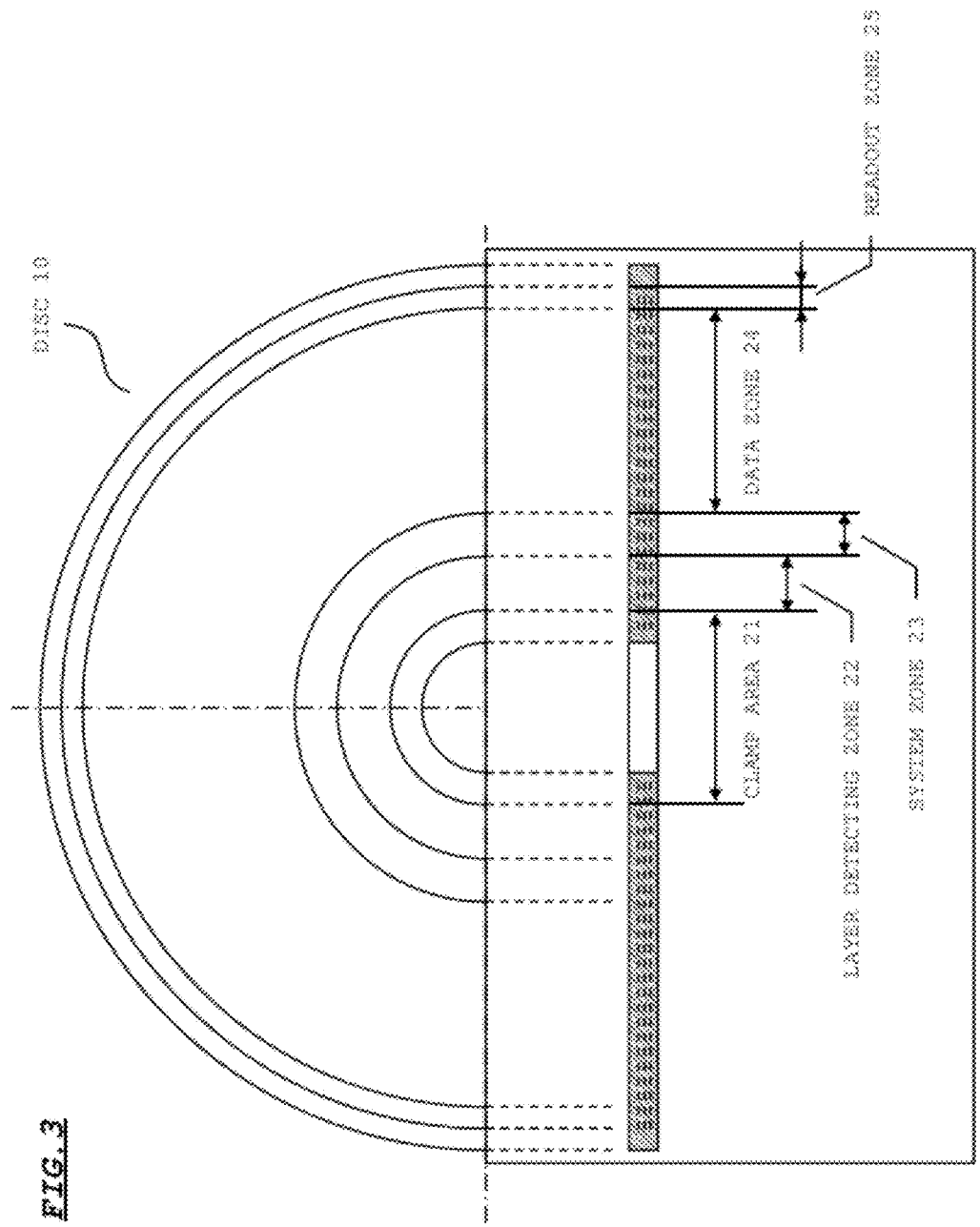
FIG. 3 is a diagram showing an area format of the optical disc in accordance with the embodiment of the present invention.

FIG. 3 is a diagram showing an area format of the optical disc 10. As shown in FIG. 3, an area of the optical disc 10 is divided into a clamp area 21, a layer detecting zone 22, a system zone 23, a data zone, 24, and a readout zone 25 radially from the inner circumference to the outer circumference of the disc 10. The aforementioned groove structure is formed from the layer detecting zone 22 to the readout zone 25.

The clamp area 21 is an area for chucking the optical disc 10 on a turntable in an optical disc apparatus. The layer detecting zone 22 is a zone for detecting order of a servo layer 13 counted from the surface layer 12. The servo layer 13 at the layer detecting zone has a layer structure for identifying the servo layer. For instance, a servo layer ID for identifying each servo layer is recorded by intermittently erasing the servo layer 13 in the circumferential direction of the disc.

The system zone 23 holds information for controlling a recording/reproducing operation. A test-write area for use in setting the power of recording light is formed in a part of the system zone 23.

User information is recorded in the data zone 24. In this embodiment, the user information is recorded in the recording layers 15 at the data zone 24 by following a scanning trajectory corresponding to a groove, as well as a scanning trajectory corresponding to a land. Information indicating that a detected area corresponds to an outer peripheral portion of the disc is recorded in the readout zone 25.

FIGS. 4A and 4B are diagrams showing an arrangement (optical system) of the optical pickup device. FIG. 4A is a plan view of the optical system, wherein quarter wavelength plates 106 and 117, a servo objective lens 107, and a recording/reproducing objective lens 118 are not illustrated. FIG. 4B is a side view of the optical system, wherein a rise-up mirror 105, the quarter wavelength plates 106 and 117, the servo objective lens 107, and the recording/reproducing objective lens 118 are illustrated.

Referring to FIGS. 4A and 4B, the reference numerals 101 through 109 indicate elements constituting an optical system for irradiating servo light on the optical disc 10, and the reference numerals 111 through 121 indicate elements constituting an optical system for irradiating recording light and reproducing light on the optical disc 10.

The semiconductor laser 101 emits servo light of 635 nm wavelength. A collimator lens 102 collimates servo light emitted from the semiconductor laser 101 into parallel light.

A polarized beam splitter 103 transmits substantially the whole of servo light to be incident from the collimator lens 102, and reflects substantially the whole of servo light to be incident from the beam expander 104. The beam expander 104 is constituted of a combination of a concave lens and a convex lens. One of the concave lens and the convex lens is driven in the optical axis direction by an actuator 133. In this example, the actuator 133 includes a motor and a worm gear, and is driven in accordance with a servo signal for use in correcting aberration of servo light on a servo layer 13.

The rise-up mirror 105 reflects servo light to be incident from the beam expander 104 in the direction of the servo objective lens 107. The rise-up mirror 105 also reflects recording light and reproducing light to be incident from the beam expander 116 in the direction of the recording/reproducing objective lens 118.

The quarter wavelength plate 106 converts servo light to be incident from the rise-up mirror 105 into circularly polarized light, and converts servo light (reflection light from the optical disc 10) to be incident from the servo objective lens 107 into linearly polarized light orthogonal to a polarization direction toward the servo objective lens 107. The servo objective lens 107 converges servo light on the servo layer 13.

An anamorphic lens 108 introduces astigmatism to servo light (reflection light from the optical disc 10) reflected on the polarized beam splitter 103. A photodetector 109 receives servo light converged on the anamorphic lens 108, and outputs a detection signal. The photodetector 109 has a four-division sensor for receiving servo light. The photodetector 109 is arranged at such a position that the optical axis of servo light passes a point of intersection of sensor dividing lines of the four-division sensor.

A femto-second laser 111 emits recording light of 800 nm wavelength. The recording light is emitted from the femto-second laser 111 as parallel light. A semiconductor laser 112 emits reproducing light of 450 nm wavelength. A collimator lens 113 collimates reproducing light emitted from the semiconductor laser 112 into parallel light. A dichroic prism 114 combines recording light emitted from the femto-second laser 111 and reproducing light emitted from the semiconductor laser 112.

A polarized beam splitter 115 transmits substantially the whole of recording light and reproducing light to be incident from the dichroic prism 114, and reflects substantially the whole of reproducing light out of the recording light and the reproducing light to be incident from the beam expander 116. Specifically, a wavelength-selective light polarization film capable of acting solely on reproducing light is formed on the polarized beam splitter 115.

The beam expander 116 is constituted of a combination of a concave lens and a convex lens, and one of the concave lens and the convex lens is driven in the optical axis direction by an actuator 134. In this example, the actuator 134 includes a motor and a worm gear, and is driven in accordance with a servo signal for pulling recording light and reproducing light onto a recording layer 15 (hereinafter, the recording layer is specifically called as a "targeted recording layer 15") to be recorded or reproduced.

Recording light and reproducing light transmitted through the beam expander 116 are reflected toward the recording/reproducing objective lens 118 by the rise-up mirror 105. The quarter wavelength plate 117 converts recording light and reproducing light to be incident from the rise-up mirror 105 into circularly polarized light, and converts recording light and reproducing light (reflection light from the optical disc 10) to be incident from the recording/reproducing objective lens 118 into linearly polarized light orthogonal to the polarization direction toward the recording/reproducing objective lens 118.

The recording/reproducing objective lens 118 converges recording light and reproducing light on the targeted recording layer 15. A wavelength-selective hologram for converging recording light and reproducing light at an identical position on the optical disc 10 is formed on a surface of the recording/reproducing objective lens 118. In other words, focal lengths of recording light and reproducing light having different wavelengths from each other are adjusted by the hologram.

The condenser lens 119 converges reproducing light (reflection light from the optical disc 10) reflected on the polarized beam splitter 115. A pinhole plate 120 has a very small pinhole, and the pinhole is formed at such a position that the pinhole coincides with a focus position of reproducing light reflected on the targeted recording layer 15. In this arrangement, a primary part of reproducing light reflected on the targeted recording layer 15 is transmitted through the pinhole, and a primary part of reproducing light (stray light) reflected on the recording layers 15 other than the targeted recording layer 15 is blocked by the pinhole plate 120, without transmitting through the pinhole.

An APD (Avalanche Photo Diode) 121 receives reproducing light transmitted through the pinhole plate 120, and outputs a reproducing signal. The APD 121 is a photodetector capable of detecting a minute change in light amount.

The quarter wavelength plates 106 and 117, the servo objective lens 107, and the recording/reproducing objective lens 118 are mounted on a holder 131 in common. In this example, the holder 131 is driven in a focusing direction, a tracking direction, and a tilt direction by an objective lens actuator 132. The objective lens actuator 132 is constituted of a well-known coil and magnetic circuit, and the coil is mounted on the holder 131. In response to supply of a servo signal to the objective lens actuator 132, the quarter wavelength plates 106 and 117, the servo objective lens 107, and the recording/reproducing objective lens 118 are displaced in the focusing direction, the tracking direction, and the tilt direction integrally with the holder 131.

Figure 5A:
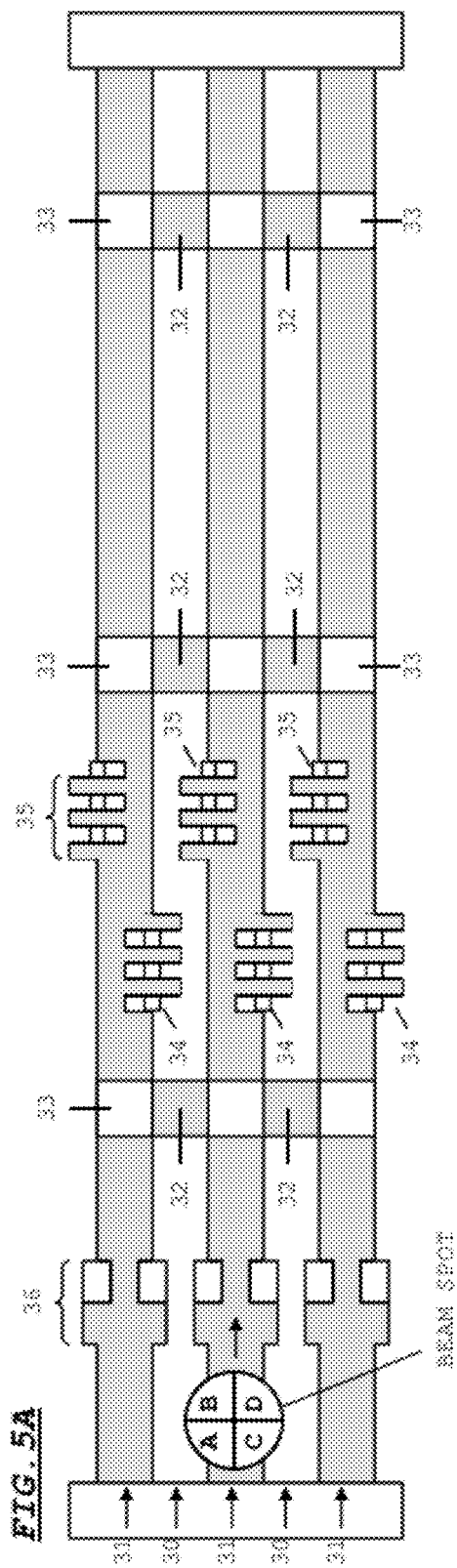
FIGS. 5A, 5B, and 5C are diagrams for describing a method for generating various servo signals in accordance with the embodiment of the present invention.

FIG. 5A is a diagram showing a groove structure of the servo layer 13.

Referring to FIG. 5A, the reference numeral 30 indicates a land, 31 indicates a groove, and 32 and 33 indicate FCMs (Fine Clock Marks) formed on the land 30 and the groove 31 at a predetermined interval. A depth of the FCM 32 is the same as the depth of the groove 31, and a height of the FCM 33 is the same as the height of the land 30.

The reference numerals 34 and 35 indicate address structures for holding physical addresses of the land 30 and the groove 31. The address structures 34 and 35 are formed by wobbling a wall surface at each of boundaries between an area of the land 30 and an area of the groove 31 in the disc radial direction. In this example, the two address structures 34 and 35 sequentially formed along the groove 31 hold the same physical address. Accordingly, different physical addresses are held in the address structures 34 and 35 formed sequentially along the land 30.

In this arrangement, the physical address on the land 30 is defined by the address structure 35 on the land 30, and the address structure 34 on the land 30 is used to acquire the physical address held in the address structure 35, in the case where the address structure 35 is not read. In other words, in this arrangement, the physical address on the land 30 is acquired by adding/subtracting an address difference between the address structures 34 and 35 on the land 30 to/from the physical address acquired by reading the address structure 34.

The reference numeral 36 indicates a tilt mark for detecting a tilt state of a servo layer 13 at a beam spot scanning position. The tilt mark 36 is formed by increasing or decreasing the groove width in the disc radial direction by a predetermined size.

Figure 5B:
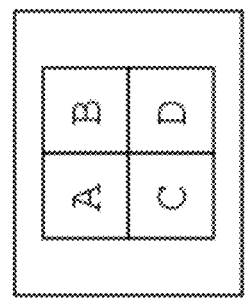
Figure 5C:
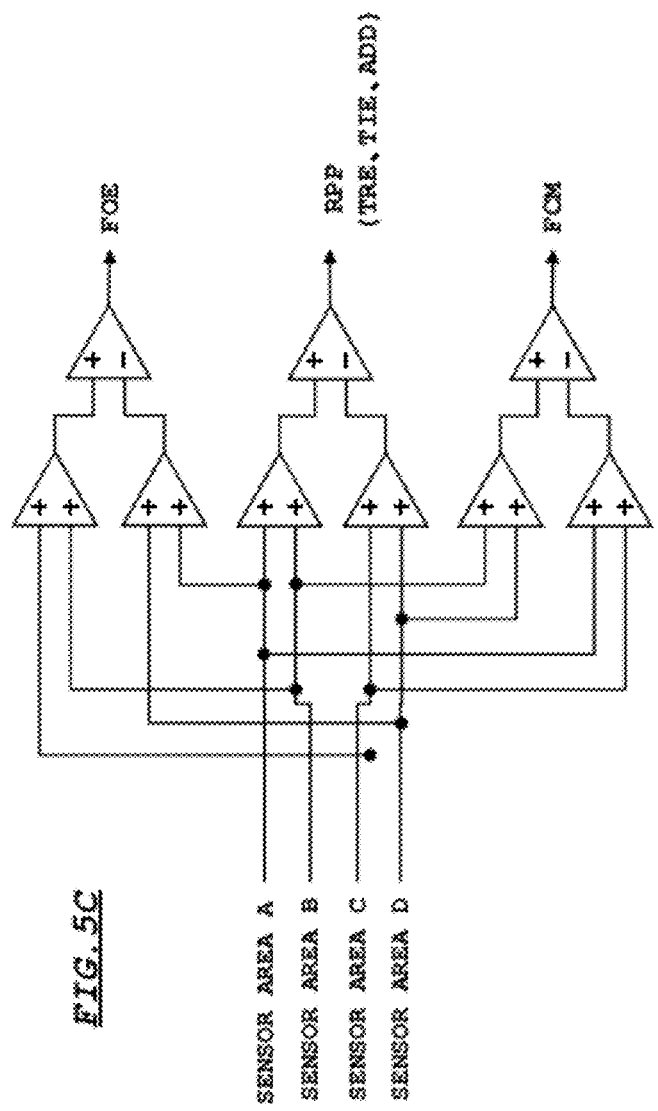

FIG. 5B is a diagram showing a four-division sensor arranged in the photodetector 109. FIG. 5C is a diagram showing a circuit arrangement (computing circuit) for generating a focusing error signal (FOE signal), a radial push-pull signal (RPP signal), and a fine clock mark signal (FCM signal) based on outputs from the four-division sensor.

As shown in FIG. 5C, the computing circuit includes six adder circuits and three subtractor circuits. Reflection light from four divided areas "A", "B", "C", and "D" of a beam spot shown in FIG. 5A is guided to sensor areas "A", "B", "C", and "D" of the four-division sensor shown in FIG. 5B, respectively. In this example, assuming that detection signals to be outputted from the sensor areas "A", "B", "C", and "D" are respectively "a", "b", "c", and "d", a focusing error signal (FOE signal) is generated by a signal computation: FOE=(b+c)−(a+d). A radial push-pull signal (RPP signal) is generated by a signal computation: RPP=(a+b)−(c+d), and a fine clock mark signal (FCM signal) is generated by a signal computation: FCM=(b+d)−(a+c).

If a beam spot is displaced in the radial direction from a center of the groove 31, a radial push-pull signal (RPP signal) has a polarity and a magnitude depending on a direction and an amount of the displacement. A tracking error signal (TRE signal) is generated by extracting the polarity and the magnitude.

If a beam spot passes a tilt mark portion 36 in a state that a servo layer 13 is tilted, an S-shaped curve appears on a radial push-pull signal (RPP signal) depending on a tilt state of the servo layer 13. A tilt error signal (TIE signal) is generated by comparing and computing an amplitude peak value of the S-shaped curve.

Further, when the beam spot passes the address structures 34 and 35, the radial push-pull signal (RPP signal) is modulated depending on the wobble shapes of the address structures 34 and 35. A physical address at the beam spot scanning position is acquired by extracting a modulated component with use of a frequency filter, and demodulating the extracted modulated component.

Figure 6:
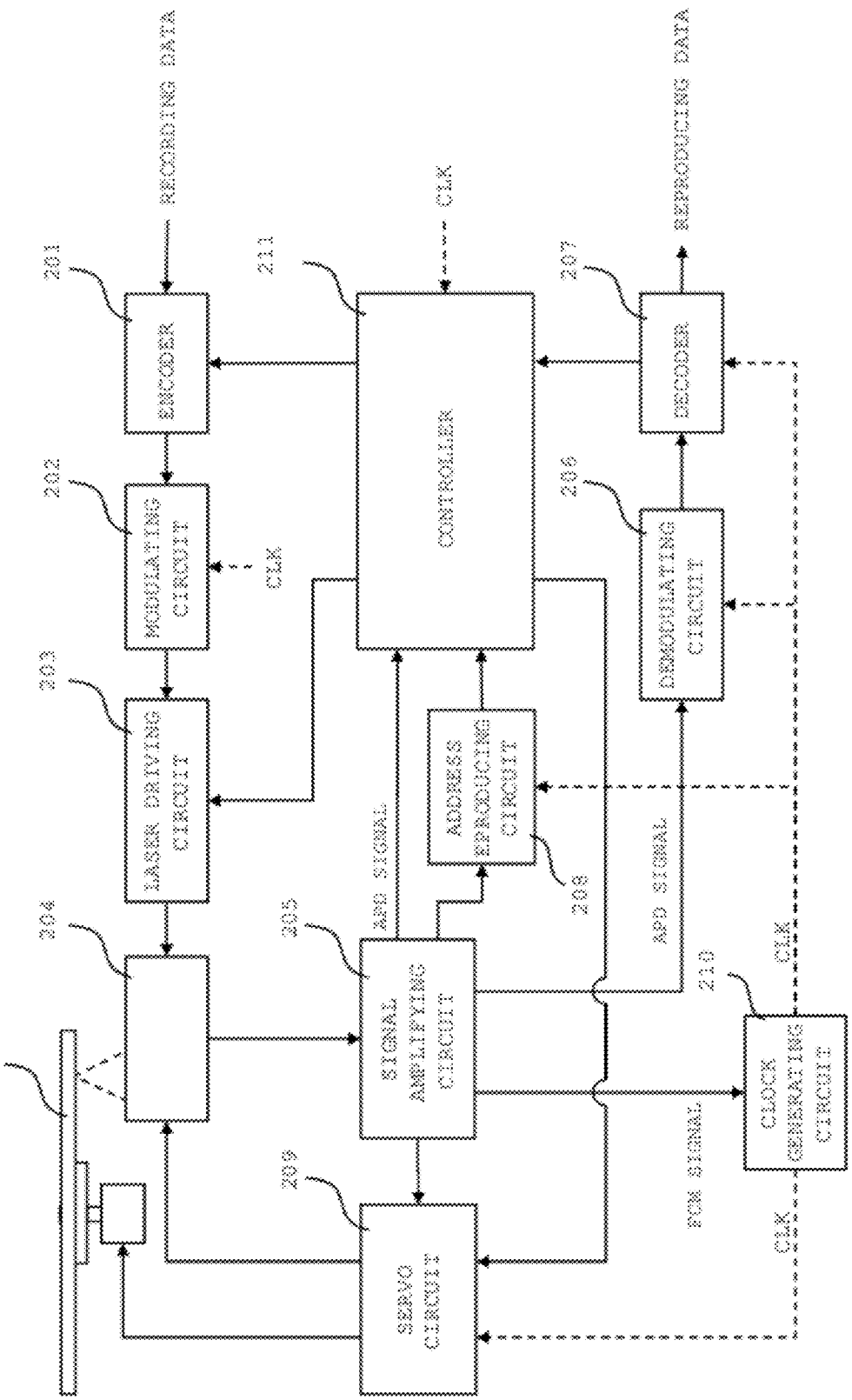
FIG. 6 is a diagram showing an arrangement of an optical disc apparatus in accordance with the embodiment of the present invention.

FIG. 6 is a diagram showing an arrangement of an optical disc apparatus for recording and reproducing information with respect to the optical disc 10.

As shown in FIG. 6, the optical disc apparatus includes an encoder 201, a modulating circuit 202, a laser driving circuit 203, an optical pickup device 204, a signal amplifying circuit 205, a demodulating circuit 206, a decoder 207, an address reproducing circuit 208, a servo circuit 209, a clock generating circuit 210, and a controller 211.

The encoder 201 encodes inputted recording data by, for example, adding an error correction code, and outputs the encoded data to the modulating circuit 202. The modulating circuit 202 modulates the inputted recording data as determined, generates a recording signal, and outputs the recording signal to the laser driving circuit 203.

In performing a recording operation, the laser driving circuit 203 supplies a drive signal in accordance with a recording signal from the modulating circuit 202 to the femto-second laser 111 in the optical pickup device 204, and supplies drive signals to the semiconductor lasers 101 and 112, respectively, in the optical pickup device 204 to cause the semiconductor lasers 101 and 112 to emit servo light and reproducing light with predetermined powers. In performing a reproducing operation, the laser driving circuit 203 supplies drive signals to the semiconductor lasers 101 and 112, respectively, in the optical pickup device 204 to cause the semiconductor lasers 101 and 112 to emit servo light and reproducing light with predetermined powers.

In this example, the laser power in performing a recording/reproducing operation is controlled based on a control signal from the controller 211. In performing a recording operation, the controller 211 performs a test-recording operation with respect to a test-write area, while changing the power of recording light, monitors an APD signal (detection signal from the APD 121) to be inputted from the signal amplifying circuit 205 in performing the test-recording operation, and sets a power of recording light which makes the level of the APD signal equal to or larger than a predetermined threshold value, as the power in performing the recording operation. In performing a reproducing operation, the controller 211 monitors an APD signal to be inputted from the signal amplifying circuit 205, while changing the power of reproducing light, and adjusts the power of reproducing light so that the level of the APD signal becomes equal to or larger than a predetermined threshold value.

The optical pickup device 204 has the optical system shown in FIGS. 4A and 4B. The signal amplifying circuit 205 includes the computing circuit shown in FIG. 5C, and a circuit arrangement for amplifying a detection signal from the APD 121 in the optical pickup device 204, and removing a noise from the detection signal. The demodulating circuit 206 demodulates an APD signal inputted from the signal amplifying circuit 205 to generate reproducing data, and outputs the reproducing data to the decoder 207. The decoder 207 decodes data inputted from the demodulating circuit 206 by, for example, error correction, and outputs the decoded data to a post-stage circuit.

The address reproducing circuit 208 extracts a frequency component, depending on the address structures 34 and 35, from a radial push-pull signal (RPP signal) inputted from the signal amplifying circuit 205, demodulates the extracted frequency component, and acquires a physical address. The acquired physical address is supplied to the controller 211. In the case where a physical address is not reproducible from one of the address structures 34 and 35, the address reproducing circuit 208 reproduces a physical address from the other one of the address structures 34 and 35.

The servo circuit 209 generates a focusing servo signal and a tracking servo signal based on a focusing error signal (FOE signal) and a tracking error signal (TRE signal) inputted from the signal amplifying circuit 205, and outputs the focusing servo signal and the tracking servo signal to the objective lens actuator 132 in the optical pickup device 204. The servo circuit 209 also generates a tilt servo signal based on an S-shaped curve on a radial push-pull signal (RPP signal) inputted from the signal amplifying circuit 205, and outputs the tilt servo signal to the objective lens actuator 132 in the optical pickup device 204. The servo circuit 209 also generates a motor servo signal based on a fine clock mark signal (FCM signal) inputted from the signal amplifying circuit 205, and outputs the motor servo signal to a disc driving motor. In addition to the above, the servo circuit 209 drives the actuators 133 and 134 in the optical pickup device 204 in performing a recording/reproducing operation, which will be described later.

The clock generating circuit 210 generates a recording clock signal and a reproducing clock signal based on a fine clock mark signal (FCM signal) inputted from the signal amplifying circuit 205, and supplies the recording clock signal and the reproducing clock signal to the respective circuits.

The controller 211 includes a CPU (Central Processing Unit), and an internal memory. Various data are stored in the internal memory, and the controller 211 controls the respective parts in accordance with a predetermined program. In this example, the controller 211 monitors the APD signal to be inputted from the signal amplifying circuit 205, and supplies a signal for controlling the powers of recording light and reproducing light in a proper range to the laser driving circuit 203. An operation of controlling the power of recording light will be described later, referring to FIGS. 8A, 8B, 9, and 10. In addition to the above, the controller 211 supplies data for test-recording to the encoder 201 in setting the power of recording light to control the respective parts to perform a test-recording operation with respect to a test-write area of the optical disc 10.

FIGS. 7A and 7B are conceptual diagrams showing control operations to be performed by the optical pickup device 204 in performing recording and reproducing operations.

In the case where recording light and reproducing light are irradiated on a targeted recording layer 15, first, the objective lens actuator 132 is driven and controlled with servo light being emitted. Then, as shown in FIG. 7A, the focus position of servo light is pulled onto a servo layer 13 (hereinafter, the servo layer is specifically called as a "targeted servo layer 13") constituting a set of layers with the targeted recording layer 15. In performing the pulling operation, the beam expander 116 is set to an initial state, and the focus positions of recording light and reproducing light are, for example, positioned on the targeted servo layer 13, as well as the servo light.

Thereafter, the beam expander 116 is driven by the number of steps required for shifting the focus positions of recording light and reproducing light to the targeted recording layer 15. Accordingly, the focus positions of recording light and reproducing light are shifted to the targeted recording layer 15. Then, the reproducing light is emitted in this state, and the beam expander 116 is minutely driven and controlled to optimize the APD signal. Accordingly, the reproducing light is focused on the targeted recording layer 15, whereby reproduction with respect to the targeted recording layer 15 is allowed.

In performing a recording operation, recording light is emitted in the above state. In performing the recording operation, the recording light is modulated (turned on/off) depending on a recording signal. Accordingly, the recording light and the reproducing light are simultaneously irradiated on a targeted recording layer 15, whereby recording with respect to the targeted recording layer 15 is performed.

As described above, in performing a recording/reproducing operation, a focusing servo signal, a tracking servo signal, and a tilt servo signal are applied to the objective lens actuator 132, and the servo objective lens 107 and the recording/reproducing objective lens 118 are integrally driven in the focusing direction, the tracking direction, and the tilt direction. Accordingly, beam spots of recording light and reproducing light scan the targeted recording layer 15 along a track corresponding to the groove or the land on the targeted servo layer 13.

Figure 8A:
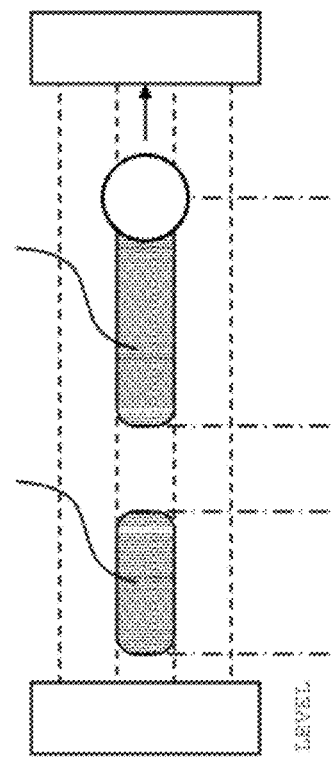
FIGS. 8A and 8B are conceptual diagrams showing an operation of controlling the power of recording light in accordance with the embodiment of the present invention.
Figure 8B:
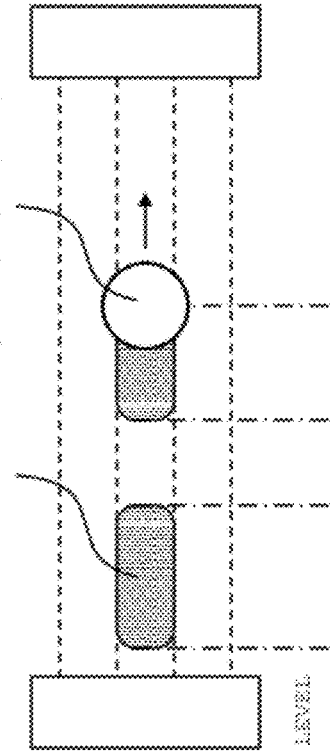

Next, an operation of adjusting the power of recording light is described referring to FIGS. 8A and 8B.

As shown in FIG. 8A, a recording mark is formed on a scanning track by scanning a recording layer by recording light and reproducing light as described above. When the scanning by recording light and reproducing light progresses from the state shown in FIG. 8A, the recording mark on the scanning track is extended, as shown in FIG. 8B. Lower parts of FIGS. 8A and 8B are diagrams each schematically showing drive signals (recording light signal and reproducing light signal) to be applied to the femto-second laser 111 and the semiconductor laser 112, respectively, in performing a recording operation, and a waveform of the APD signal to be outputted from the APD 121 in applying the drive signals.

In this embodiment, since the reflectance of a recording mark forming portion is increased as compared with the reflectance of a recording mark non-forming portion, the APD signal rises after a recording mark forming is started, and falls after the recording mark forming is ended.

The power of recording light is controlled in such a manner that the amplitude Lh of the APD signal lies within a range between predetermined threshold values L1 and L2. In this example, the threshold values L1 and L2 define a range of the power of recording light capable of generating a sufficient reflectance change by forming a recording mark, and suppressing an erroneous recording operation in an adjacent track (off-track formation of a recording mark), cross-erasing, and the like.

FIG. 9 is a flowchart showing an operation of setting the power of recording light at a recording start time.

When a power setting operation is started, servo light is emitted, while the optical disc 10 is subjected to servo control for rotation (Step S101). Then, the optical pickup device 204 accesses to a test-write area based on a physical address acquired from the address structure 34 and 35 of a targeted servo layer 13 (Step S102). Thereafter, reproducing light is emitted (Step S103). Then, as described above, the beam expander 116 is driven to pull the reproducing light onto a targeted recording layer 15 in the test-write area (Step S104).

Thereafter, the power Pw of recording light is set to an initial power, and a test-recording operation is performed with respect to the test-write area with the power Pw (Step S106). Concurrently with the test-recording operation, the APD signal is monitored (Step S107). Then, it is judged whether the amplitude Lh of the APD signal lies within the range between the threshold values L1 and L2 (Step S108). If the judgment result is negative (NO in Step S108), the power Pw is changed by a predetermined level in such a direction as to set the amplitude Lh of the APD signal in the range between the threshold values L1 and L2 (Step S109). Then, the test-recording operation is performed with respect to the test-write area with the changed power Pw (Step S106). Then, similarly to the above, the APD signal is monitored (Step S107).

The operations from Step S106 through Step S109 are repeated, and if the amplitude Lh of the APD signal lies within the range between the threshold values L1 and L2 (YES in Step S108), the power Pw in the above state is set as the recording power in recording primary information (Step S110). Thus, the operation of setting the power of recording light at the recording start time is ended.

Figure 10:
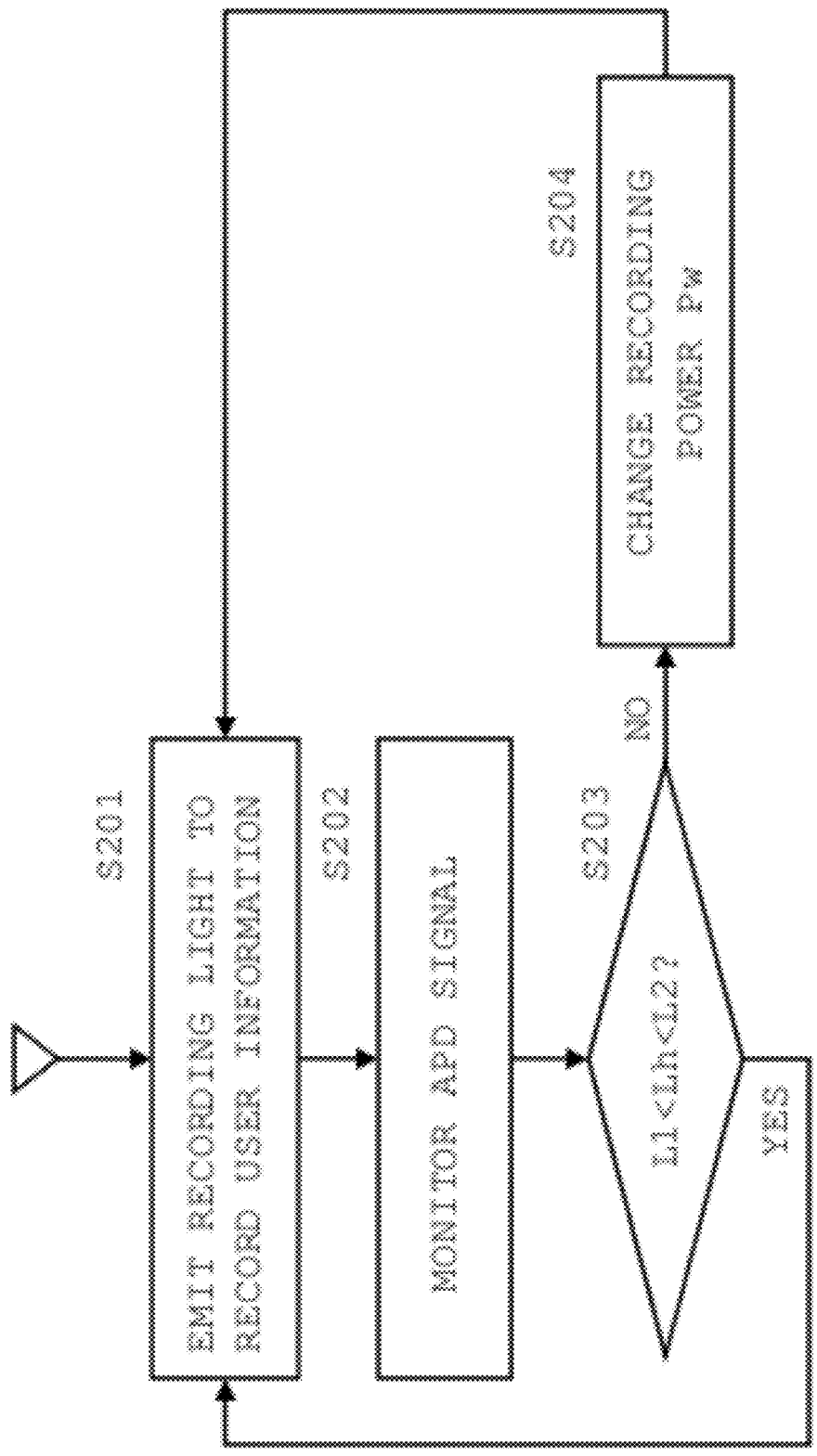
FIG. 10 is a flowchart showing an operation of adjusting the power of recording light in accordance with the embodiment of the present invention.

FIG. 10 is a flowchart showing an operation of adjusting the power of recording light to be performed during an operation of recording primary information, after the recording power is set in accordance with the operation flow shown in FIG. 9.

After recording light is emitted and user information is recorded (Step S201), the APD signal is monitored concurrently with the recording operation (Step S202). Then, it is judged whether the amplitude Lh of the APD signal lies within the range between the threshold values L1 and L2 (Step S203). If the judgment result is affirmative (YES in Step S203), the power in the above state is maintained as the power of recording light, and a recording operation thereafter is continued (Step S201). If, on the other hand, the judgment result in Step S203 is negative (NO in Step S203), the power Pw is changed by a predetermined level in such a direction as to set the amplitude Lh of the APD signal in the range between the threshold values L1 and L2 (Step S204). Then, a recording operation thereafter is performed with the changed power Pw (Step S201).

The operations of Step S203 and Step S204 are performed concurrently with an operation of recording user information during a recording operation. Accordingly, the power of recording light is successively adjusted in such a manner that the amplitude Lh of the APD signal lies within the range between the threshold values L1 and L2.

As described above, in the embodiment, solely the reproducing light out of the recording light and the reproducing light reflected on the optical disc 10 in performing a recording operation is guided to the APD 121 by the functions of the polarized beam splitter 115 and the quarter wavelength plate 117. Thus, a recording state with respect to the targeted recording layer 15 can be successively monitored, based on a signal to be outputted from the APD 121.

Accordingly, judgment as to whether the power of recording light is proper can be made by monitoring a signal to be outputted from the APD 121, and the power of recording light can be controlled to a proper level based on the judgment. In this example, judgment as to whether the recording power is proper can be made concurrently with a recording operation, as necessary, without individually setting a test-writing step and a reproducing step. Accordingly, the operation of setting the power of recording light can be smoothly performed at the recording start time, and the power of recording light can be adjusted, as necessary, even in a recording operation. Thus, in this embodiment, the operation of controlling the power of recording light can be speedily and smoothly performed.

In this embodiment, the test-recording operation is performed with respect to the test-write area of the optical disc 10, while changing the power of recording light; and the power of recording light to be used in recording primary information is set based on a signal to be outputted from the APD 121 in performing the test-recording operation. This enables to smoothly and speedily set the power of recording light at the recording start time because a step of judging whether a recording state is proper by reproducing the information recorded in the test-write area is not required.

Further, in this embodiment, the recording power is monitored based on a signal to be outputted from the APD 121 even in recording primary information to adjust the power of recording light. Thus, the power of recording light can be smoothly adjusted even in recording primary information.

The embodiment of the present invention is not limited to the above, but various modifications are applicable.

For instance, in the foregoing embodiment, the power of recording light is controlled by monitoring the amplitude Lh of the APD signal. Alternatively, for instance, similarly to an arrangement employed in an existing DVD (Digital Versatile Disc), the power of recording light may be controlled to make the value β of the APD signal close to an intended value; or the power of recording light may be controlled based on the other evaluation parameter to be acquired based on the APD signal.

In the foregoing embodiment, four sets of layers each constituted of a servo layer 13 and a predetermined number of recording layers 15 are formed in the laminated direction. The number of layer sets each constituted of a servo layer 13 and a predetermined number of recording layers 15 may not be a plural number, but may be one. Further alternatively, the number of recording layers 15 to be formed in combination with the servo layer 13 may not be a plural number, but may be one.

In the foregoing embodiment, the beam expander 116 is used to adjust the focus positions of recording light and reproducing light. Alternatively, a liquid crystal element or the like may be used, in place of the beam expander 116.

In the foregoing embodiment, the energy level of the recording layer 15 is raised by irradiating reproducing light in performing a recording operation. Alternatively, reproducing light may be irradiated solely to monitor a state of a recording mark, without contributing to raising the energy level of a recording layer 15. Further alternatively, in the case where the power of recording light is not adjusted in recording user data, the state of the recording mark may be monitored by irradiating reproducing light only during a test-writing operation, and a recording operation may be performed by recording light alone by turning off reproducing light in recording user data.

Further, the wavelengths of the respective laser light, the materials of the layers, the film thicknesses, and the like are not limited to the above. Furthermore, the arrangements of the optical disc apparatus may be changed or modified as necessary.

The embodiment of the present invention may be changed or modified in various ways as necessary, as far as such changes and modifications do not depart from the scope of the claims of the present invention hereinafter defined.

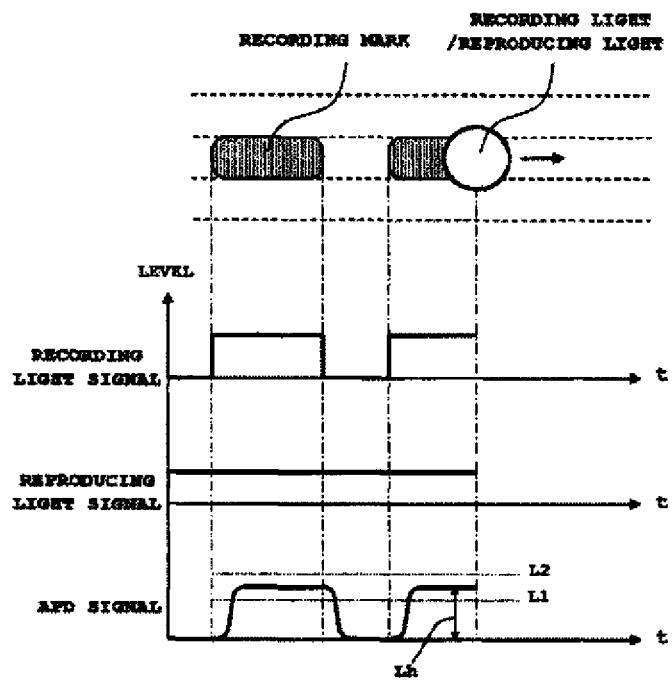
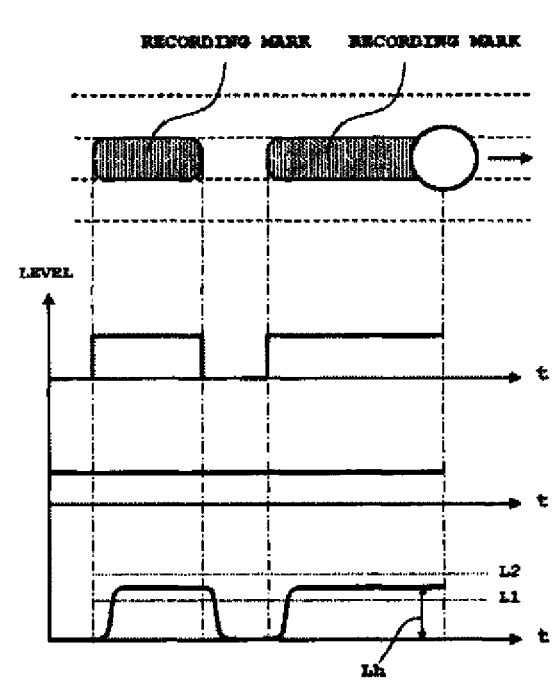

What is claimed is:

1. An optical pickup device comprising:
a first light source for emitting recording laser light;
a second light source for emitting reproducing laser light having a wavelength different from a wavelength of the recording laser light;
an objective lens for converging the recording laser light and the reproducing laser light;
a quarter wavelength plate disposed between the first light source and the second light source, and the objective lens, both of the recording laser light and the reproducing laser light being incident into the quarter wavelength plate;
a photodetector for receiving the reproducing laser light reflected on a recording medium; and
a wavelength-selective polarized beam splitter, disposed between the quarter wavelength plate, and the first light source and the second light source, both of the recording laser light and the reproducing laser light being incident into the wavelength-selective polarized beam splitter, for guiding the reproducing laser light alone out of the recording laser light and the reproducing laser light reflected on the recording medium to the photodetector.

2. A recording and reproducing apparatus comprising:
a optical pickup device;
a recording circuit;
and a power control circuit, wherein,
the optical pickup device include;
a first light source for emitting recording laser light, a second light source for emitting reproducing laser light having a wavelength different from a wavelength of the recording laser light,
an objective lens for converging the recording laser light and the reproducing laser light,
a quarter wavelength plate disposed between the first light source and the second light source, and the objective lens, both of the recording laser light and the reproducing laser light being incident into the quarter wavelength plate,
a photodetector for receiving the reproducing laser light reflected on a recording medium, and
a wavelength-selective polarized beam splitter, disposed between the quarter wavelength plate, and the first light source and the second light source, both of the recording laser light and the reproducing laser light being incident into the wavelength-selective polarized beam splitter, for guiding the reproducing laser light alone out of the recording laser light and the reproducing laser light reflected on the recording medium to the photodetector;
the recording circuit performs a recording operation with respect to the recording medium by at least the recording laser light, while simultaneously driving the first light source and the second light source; and
the power control circuit monitors a signal to be outputted from the photodetector in performing the recording operation to control a power of the recording laser light based on the signal.

3. The recording and reproducing apparatus according to claim 2, wherein
the power control circuit causes the recording circuit to perform a test-recording operation with respect to a test-write area of the recording medium, while changing the power of the recording laser light to set the power of the recording light in recording primary information, based on the signal to be outputted from the photodetector in performing the test-recording operation.

4. The recording and reproducing apparatus according to claim 3, wherein
the power control circuit is operable to compare an amplitude of the signal to be outputted from the photodetector in performing the test-recording operation with a threshold value to set the power of the recording laser light.

5. The recording and reproducing apparatus according to claim 3, wherein
the power control circuit is operable to adjust the power of the recording laser light in recording the primary information based on the signal to be outputted from the photodetector in recording the primary information.

6. The recording and reproducing apparatus according to claim 5, wherein
the power control circuit is operable to compare an amplitude of the signal to be outputted from the photodetector in recording the primary information with a threshold value to adjust the power of the recording laser light.

* * * * *

UNITED STATES PATENT AND TRADEMARK OFFICE
CERTIFICATE OF CORRECTION

| | |
|---|---|
| PATENT NO. | : 8,238,221 B2 |
| APPLICATION NO. | : 12/541685 |
| DATED | : August 7, 2012 |
| INVENTOR(S) | : Morio Nakatani et al. |

It is certified that error appears in the above-identified patent and that said Letters Patent is hereby corrected as shown below:

Title page, illustrative figure and Drawing Sheet 1 of 10, FIG. 1, the boxes on the left and right ends of the layers should be removed, and the box at the bottom of the drawing over the labels should be removed:

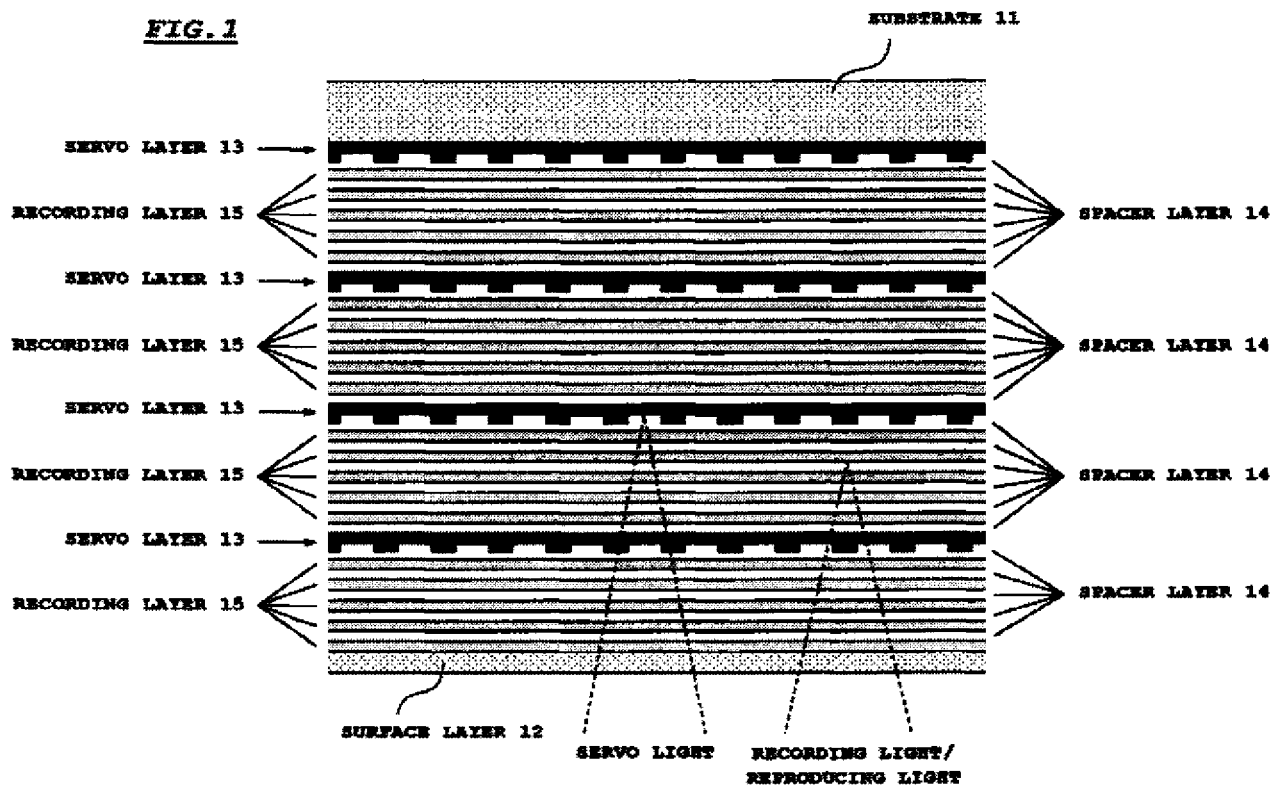

Signed and Sealed this
Fourth Day of December, 2012

David J. Kappos
*Director of the United States Patent and Trademark Office*

CERTIFICATE OF CORRECTION (continued)
U.S. Pat. No. 8,238,221 B2

In the drawings, FIG. 2, the boxes around the various legend labels should be removed:

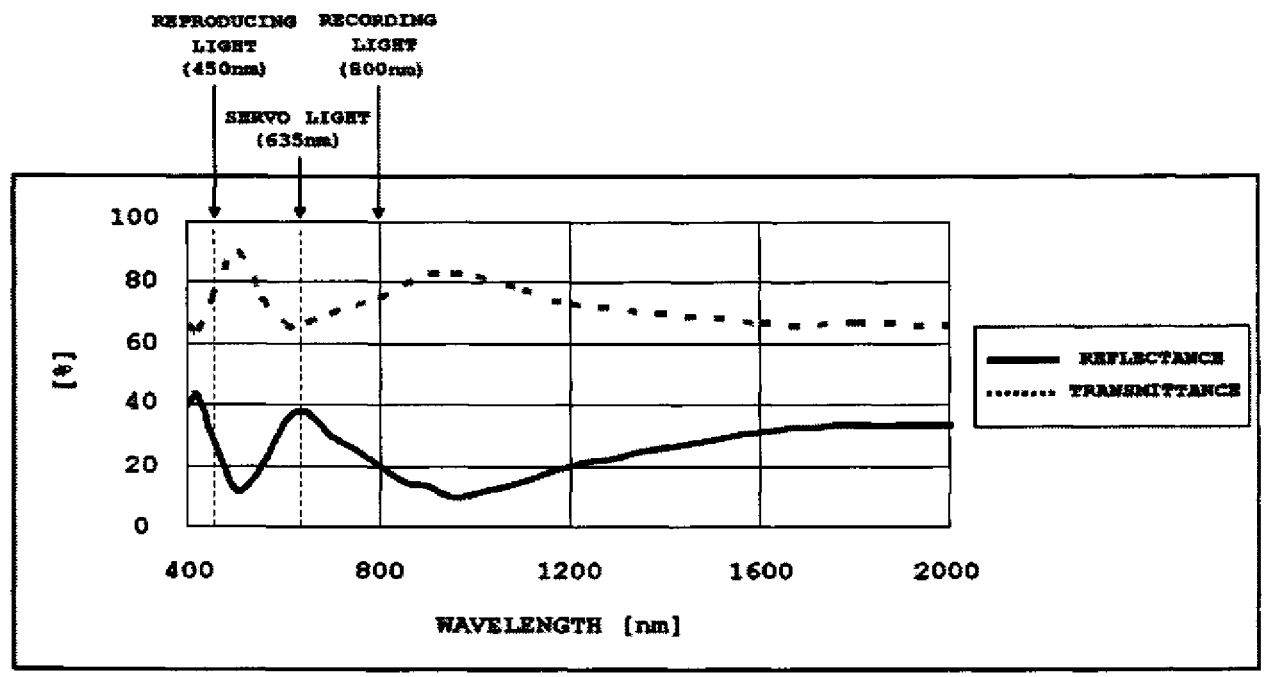

In the drawings, FIG. 3, the box at the bottom of the drawing should be removed:

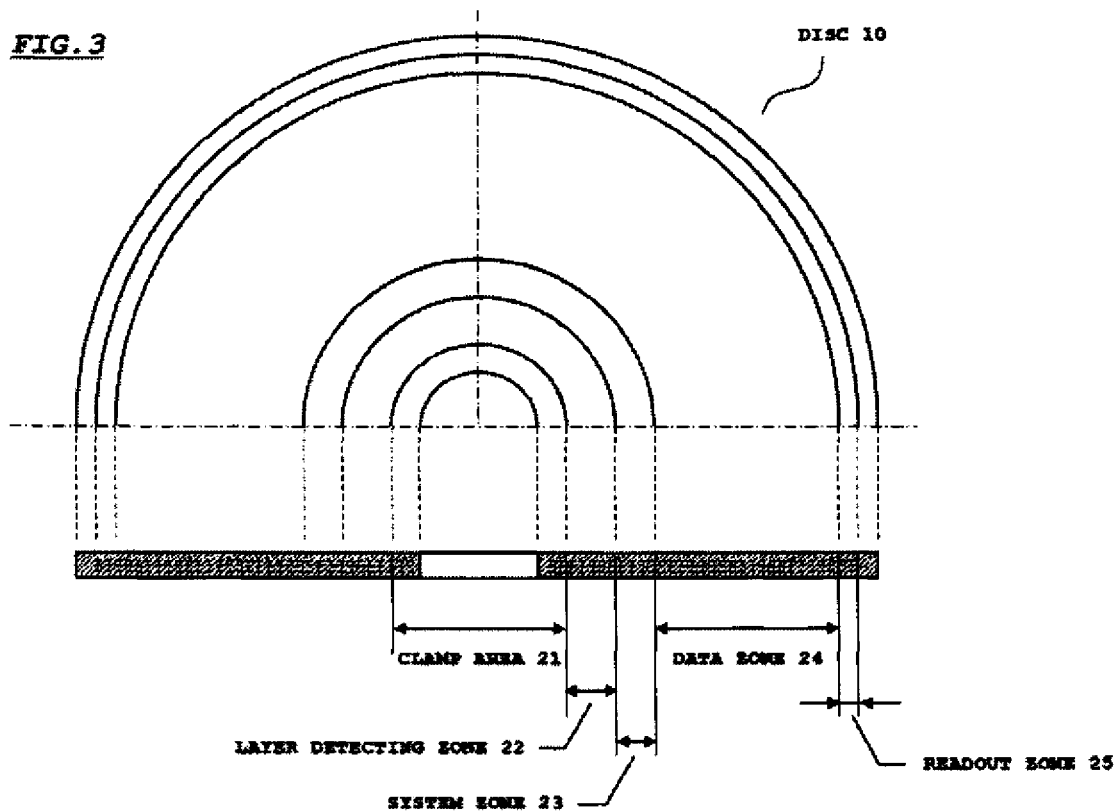

In the drawings, FIG. 4B, the boxes on both ends of the "OPTICAL DISC 10" should be removed:

CERTIFICATE OF CORRECTION (continued)

U.S. Pat. No. 8,238,221 B2

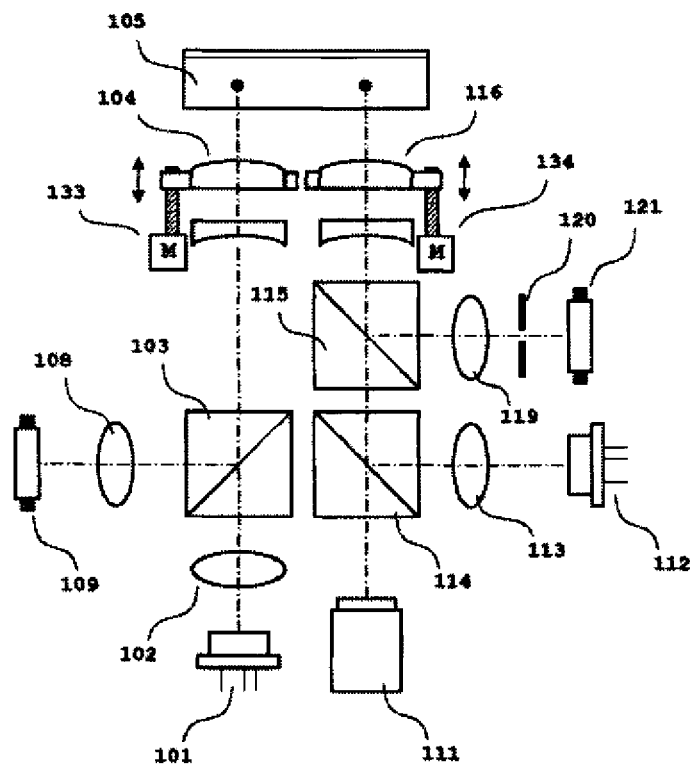

FIG. 4A

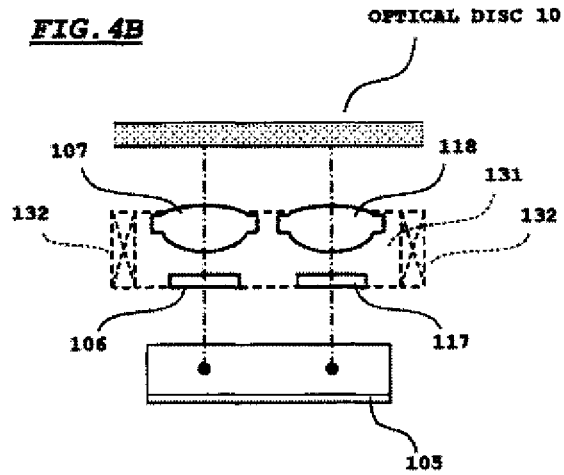

FIG. 4B

In the drawings, FIG. 5A, the boxes on the left and right ends of the drawing and the various boxes at features 36, 34, and 35 should be removed:
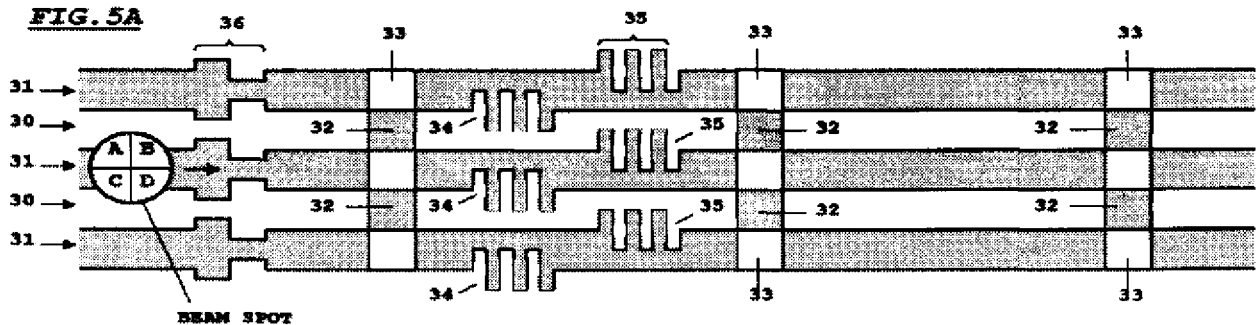
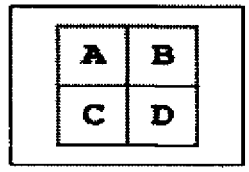
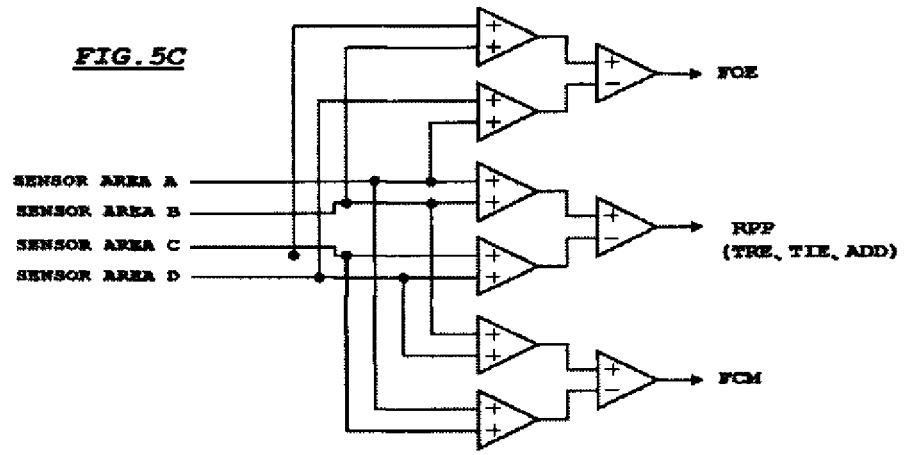
In the drawings, FIGS. 7A-7B, the boxes on the left and right ends of the layers in each of FIGS. 7A

CERTIFICATE OF CORRECTION (continued)
U.S. Pat. No. 8,238,221 B2 and 7B should be removed, the boxes at the bottom in each of FIGS. 7A and 7B over the labels should be removed, and the boxes over the labels in between FIGS. 7A and 7B should be removed:

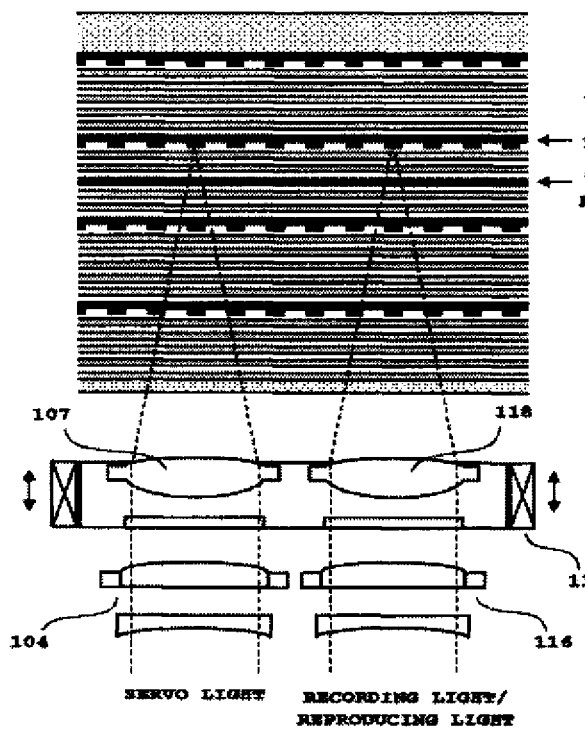
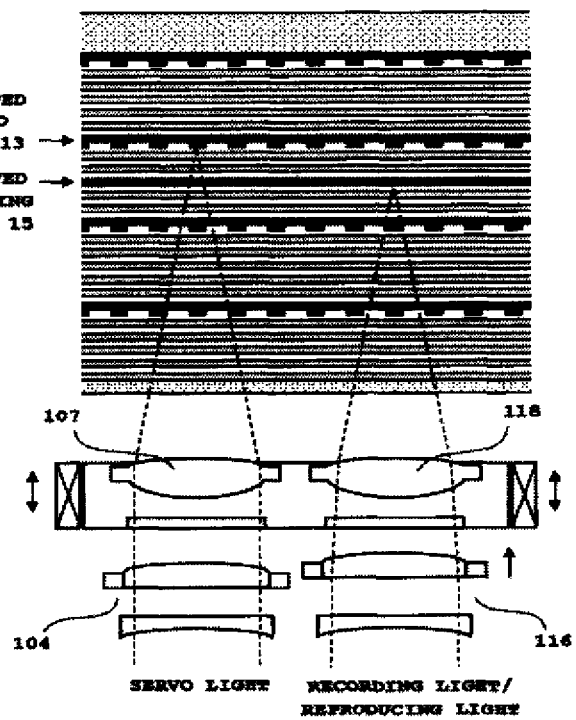

In the drawings, FIGS. 8A-8B, the boxes on the left and right upper ends of each of the drawings should be removed: